United States Patent [19]

Gardien et al.

[11] Patent Number: 5,715,417
[45] Date of Patent: Feb. 3, 1998

[54] AUTOMATICALLY TEMPORARILY ENABLING A DISPLAYED MENU OPTION

[76] Inventors: Paulus F. L. Gardien; Johanna M. De Bont, both of Groenewoudseweg 1, 5621 BA Eindhoven, Netherlands

[21] Appl. No.: 526,020

[22] Filed: Sep. 8, 1995

[30] Foreign Application Priority Data

Sep. 12, 1994 [EP] European Pat. Off. ............ 94202613

[51] Int. Cl.$^6$ ............................................ G06F 3/00
[52] U.S. Cl. ................................ 395/352; 395/327
[58] Field of Search ......................... 395/326–358, 395/806; 345/117–120, 146, 123, 902

[56] References Cited

U.S. PATENT DOCUMENTS

| | | | |
|---|---|---|---|
| 4,479,197 | 10/1984 | Haag et al. | 395/352 X |
| 4,656,603 | 4/1987 | Dunn | 395/348 |
| 4,879,648 | 11/1989 | Cochran et al. | 395/352 X |
| 5,021,976 | 6/1991 | Wexelblat et al. | 395/348 |
| 5,124,942 | 6/1992 | Nielsen et al. | 395/352 X |
| 5,206,929 | 4/1993 | Langford et al. | 395/328 |
| 5,396,264 | 3/1995 | Falcone et al. | 345/146 |
| 5,513,306 | 4/1996 | Mills et al. | 395/328 |
| 5,557,724 | 9/1996 | Sampat et al. | 395/328 |
| 5,680,077 | 7/1972 | Hoberecht | 345/123 |

FOREIGN PATENT DOCUMENTS 2274233  7/1994  United Kingdom ............ G06F 3/14

OTHER PUBLICATIONS

Advanced Interface Design Guide, IBM Corp., pp. 25–29, 55–59, 63–75, Jun. 1989.

Murie, "MediaMaker Makes Mac Move", MacWeek, pp. 53–54, 56, Mar. 26, 1991.

Tonomura et al., "Content Oriented Visual Interface Using Video Icons for Visual Database Systems", IEEE, pp. 68–73, 1989.

Foley et al., "Computer Graphics: Principles and Practice", 2nd ed., Addison–Wesley Pub. Co., pp. 435–44, 1990.

Young, "The X Window System", Prentice–Hall, pp. 1–64, 1990.

*Primary Examiner*—Raymond J. Bayerl
*Assistant Examiner*—John E. Breene

[57] ABSTRACT

A method of enabling a user to select a service from among a plurality of services offered presents each time a next service from the variety offered and enables the user to select this service by executing of a simple affirmation operation. By simultaneously showing various services from the variety of services offered, the user is given a survey of the variety available so that making a comparative choice is easier.

22 Claims, 2 Drawing Sheets

AUTOMATICALLY TEMPORARILY ENABLING A DISPLAYED MENU OPTION

FIELD OF THE INVENTION

The invention relates to a method of enabling a user to select a service from among a plurality of services available in a system, each service being visually represented on a display screen by an associated option, which method comprises:

- temporarily enabling the system, in a predetermined sequence, for selection of one of the options,
- detecting said selection of a given option while the system is enabled for selection of the given option, and
- presenting the service represented by the selected option.

A method of this kind is known from U.S. Pat. No. 5,124,942. The known method is used for the programming of complex machines utilizing a simple and inexpensive user interface. The interface consists of a display, on which a single question or status can be displayed, and a user control whereby a user can express affirmation. The cited reference mentions a video recorder and a microwave oven as examples of machines to be programmed. According to the known method all options available to a user in a given situation are displayed one by one. An option appears on the display for a given period of time and the user can select this option by depressing the control. If the user fails to do so, the next option will appear after some time so as to be selected by the user. This process continues until the user has selected an option. It is a drawback of the known method that the user does not have a survey of the complete set of options available in a given situation. The user is always confronted by one option from among a larger number of options without seeing the other possibilities. This problem becomes greater when the user must make a selection at a number of different levels, a next level being dependent on the selection at the preceding level. Such a hierarchy of selections often occurs in the cited reference.

OBJECT OF THE INVENTION

It is inter alia an object of the invention to provide a method of the kind set forth in which a user can select an option from a presentation of options where a number of options are simultaneously displayed so that the user has a survey of the options offered and can anticipate on options which will become selectable after the present option. To this end, the method of the invention is characterized in that it also comprises:

- simultaneous display on the display screen of the option for which the system is temporarily enabled and of at least one further option from the sequence, and
- characterization of the option for the selection of which the system is enabled.

The selection of an option while at the same time a number of alternatives are displayed makes it easier for the user to make .a selection by comparison.

Methods in which options are displayed on a display screen as symbols wherefrom the user can make a selection are known per se. These methods are used in menu systems with icons representing applications to be selected. Such use of icons is described, for example in U.S. Pat. No. 5,021,976. In menu systems utilizing such options the user indicates and selects a desired option. To this end, the user utilizes a control means, for example a mouse or a joystick, whereby the user positions a cursor onto or near the desired option and affirms the selection by depression of a control. Notably the necessity of active positioning is problematic to many users of these menu systems. In a menu system in which the method of the invention is used, the menu system sequentially makes one of the options available for selection and the user affirms a proposal by depression of the control. The user need not actively indicate an option, because this is done by the menu system; it suffices to express affirmation. Another drawback of the known methods consists in that they require an advanced control means which enables control of a cursor. An apparatus for carrying out the method of the invention may comprise a much simpler control means, i.e. a single control. This allows for a simpler and hence less expensive apparatus.

A version of the method in accordance with the invention is characterized in that it includes the presentation, while the system is enabled for selection of the given option, of informative data concerning the service represented by the given option, the informative data not being necessary to distinguish the options from one another. The informative data provide the user with an explanation of the service which can be selected. This explanation may be an indication of the type of service, but may also be a summary of recent innovations in the service. The informative data may be audio as well as video data.

A version of the method in accordance with the invention is characterized in that the system is enabled for selection of one of the options in a cyclic sequence. A user sees the options becoming selectable one by one and is each time given the opportunity to select the relevant option. As a result of the cyclic organization of the options, i.e. after the last option the first option appears again, the user is given the possibility of selecting an option as yet after a previous non-selection. A further advantage of the cyclic organization resides in the fact that the actual sequence of the options always remains the same, so that anticipation on upcoming options is very well possible.

A version of the method of the invention is characterized in that it comprises:

- detection of designation of an option by the user, and
- enabling the system for selection of the designated option on the basis of the designation and as a deviation from said sequence.

The method then enables the user to break through the sequence in which the system is enabled for the options. This is particularly attractive to an experienced user wishing to make a deliberate choice without further explanation.

A version of the method of the invention is characterized in that the method is used to select a video film. The need for a simple method of selecting a service exists notably in the field of video film selection. A user at home then selects, for example by way of a menu displayed on his television receiver, a given video film which is subsequently displayed at the user's home from a central location, via a link. The method of the invention, where a user can select a service merely by depressing a single control, is very suitable for the consumer field in which a large variety of users are active.

A version of the method of the invention is characterized in that the service includes rendering a further service selectable as described above. In practice, the selection of a service will usually be based on a number of sub-selections made. For example, after the selection of the video films service, a selection has to be made in respect of category of film, and finally of the actual film. The method of the invention can be advantageously used in such a hierarchy of options. The service selected by selection of an option then implies another selection of a service by way of the method of the invention.

The invention also relates to a system for selecting a service from among a plurality of services available, which system comprises a server and a user station, the server comprising:

server means for dispatching a series of options and the service under the control of control signals, and server connection means for receiving the control signals and for dispatching the series of options and the service, the user station being provided with a display screen and with station connection means for connection to the server connection means to dispatch the control signals and to receive the series of options and the service, and being suitable for:

presentation means for temporarily enabling, in a predetermined sequence, the user station for selection of one of the options, and selection means for selecting a given option for which the user station is enabled.

Such a system makes it possible to present a variety of services to a large number of end users from a central machine. A known service is the so-called video-on-demand service where a user selects a title and the central machine subsequently plays this film for the end user in question. Other services are electronic shopping and the delivery of information on various subjects. It is a characteristic feature of such a system that the services are variable in two respects. First of all, new services can be added, so the number of services is variable. Secondly, the contents of a service can be extended, so there is a system with variable contents. The selection of a service in such a system should support these two aspects. To this end, the system in accordance with the invention is characterized in that the presentation means are suitable for the simultaneous display on the display screen of the option for which the user station is enabled and at least one further option from the series, the presentation means also being suitable to characterize the option for selection of which the user station is enabled. The system of the invention provides a flexible set-up for the selection of a service by the user. On the server the options are adapted to the changing services and subsequently the adapted options also become available at the user station.

The invention also relates to a server for use in the system according to the invention. A server in accordance with the invention enables the described method of the invention to be carried out. Because the services to be delivered by a server are regularly extended and renewed, the menu system of the user system should also be adapted at regular intervals. To this end, the server is arranged so that it transmits the menu system to the user station. This results in a flexible organization in which the menu system can be adapted on the server at regular intervals and nevertheless the newest version of the menu system is always present at the user stations.

The invention also relates to an apparatus for use in the user station in a system as described above, the apparatus comprising:

connection means for dispatching control signals and for receiving a series of options, an output for dispatching image signals to a display screen, and being suitable for:

presentation means for temporarily enabling, in a predetermined sequence, the apparatus for selection of one of the options, and selection means for selecting a given option for which the user station is enabled.

The apparatus provides the presentation of the options on the display screen of the user and processes with the selection by the user. The apparatus is arranged to carry out the method of the invention, for which purpose it is characterized in that the presentation means are arranged for the simultaneous representation in the image signals of the option for which the user station is enabled and at least one other option from the series, the presentation means also being arranged to characterize the option for selection of which the user station is enabled.

BRIEF DESCRIPTIONS OF THE DRAWINGS

Further attractive embodiments are defined in dependent claims. The invention will be described in detail hereinafter, by way of example, with reference to the drawing; therein:

DESCRIPTION OF THE PREFERRED EMBODIMENTS

Figure 1:
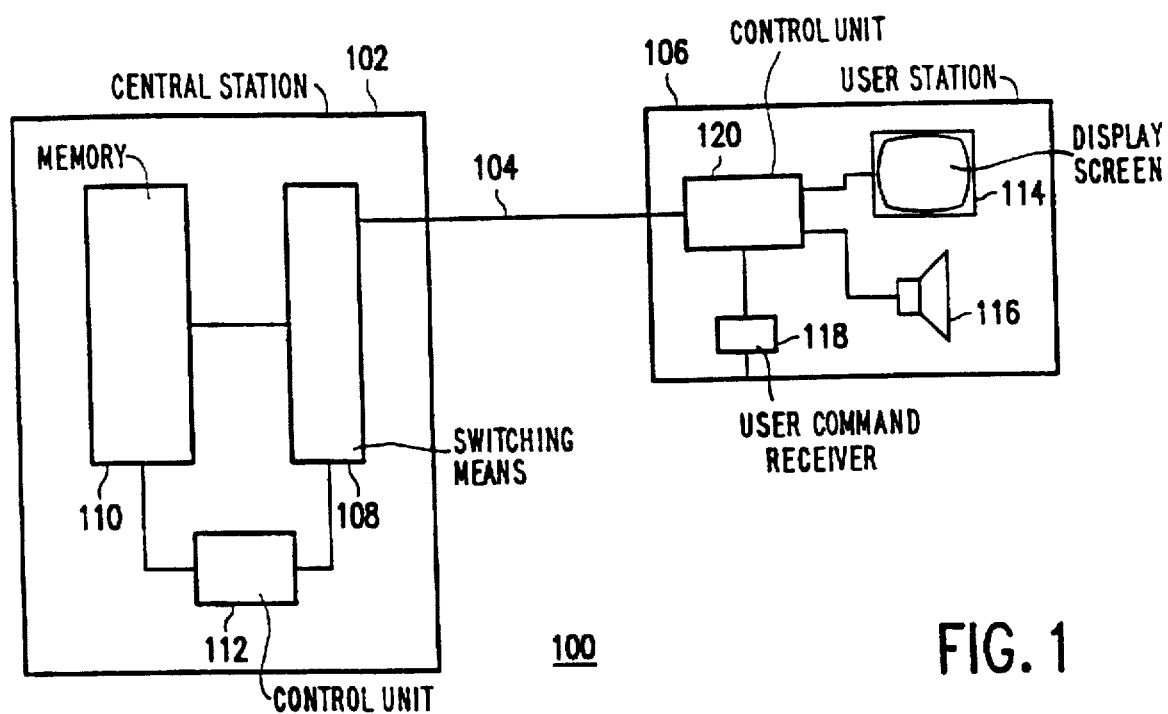
FIG. 1 shows a system in which the method of the invention is used.

FIG. 1 shows a system in which the method of the invention is used. The Figure shows the functional elements of the system, without showing all physical elements. The system serves to make a variety of services available to a large number of end users from a central point. Examples of such services are the showing of a video film as demanded by a user, i.e. the so-called video-on-demand service, electronic shopping, and supplying travel information. The system 100 comprises a central station 102, referred to as a server, and a user station 106 which is connected thereto via a connection 104. The server can virtually simultaneously serve a large number of user stations by way of switching means 108. The server comprises a memory 110 which stores inter alia the information which can be supplied to a user, for example said video films. The information can be stored therein in various ways and in various formats. Video films may be stored, for example on a Compact Disc, tape or a hard disc and may be present in various formats, such as analog, digital, MPEG. The server also comprises a control unit 112 for controlling the connection of the user station and for dispatching the information to the user station. The user station comprises a display screen 114, a sound reproduction device 116, a receiver 118 for receiving user commands, and a control unit 120. The display screen 114 and the sound reproduction device 116 may be integrated as a standard television receiver. The receiver 118 may be constructed as an infrared receiver for the reception of signals from a remote control, but also as a connection unit for a mouse or another control means.

The operation of the system can be described in general as follows. After having started the user station, a user selects a given service from the current possibilities being offered. This offer is displayed on the display screen by way of a menu system which operates according to the method of the invention and which will be described in detail hereinafter. After the user has made a selection, for example a selection to watch a given video film, the server will offer the relevant service, i.e. it will transmit the video film to the user station via the connection 104. Because the services to be offered by a server are regularly extended and renewed, the menu system of the user station should also be regularly updated. To this end, a given embodiment of the system is organized so that the server dispatches the menu system to the user station during the starting of the latter. This results in a flexible organization in which the menu system can be regularly updated in a central location, the newest version of the menu system nevertheless being present in the user stations. In another embodiment, the menu system is already present in the user station upon starting, for example on a disc inserted therein at an earlier instant.

Two-way traffic exists on the connection 104. From the user station commands are applied to the server to request given data, for example given video information and images for the menu, and to select and control a service, for example inserting an intermission in a video film. A variety of data, often consisting of audio and video information, is applied from the server to the user station. The connection can be realised in various ways. In a given embodiment an existing telephone mains is chosen, utilizing so-called ASDL (Asymmetric Digital Subscriber Loop) modems. A network comprising coaxial cables or fibre optical cables, however, is also feasible.

The display screen 114 can be realised in various appropriate ways. The display screen 114 shown may consist of two different sections, one section being used to display the menu systems with the options, whereas the other section is used to display images associated with the service. The display screen can be constructed as a cathode ray tube, a screen based on an LCD technique, with symbols composed of LED or LCD segments, or in another manner enabling the reproduction of the relevant information.

Figure 2:
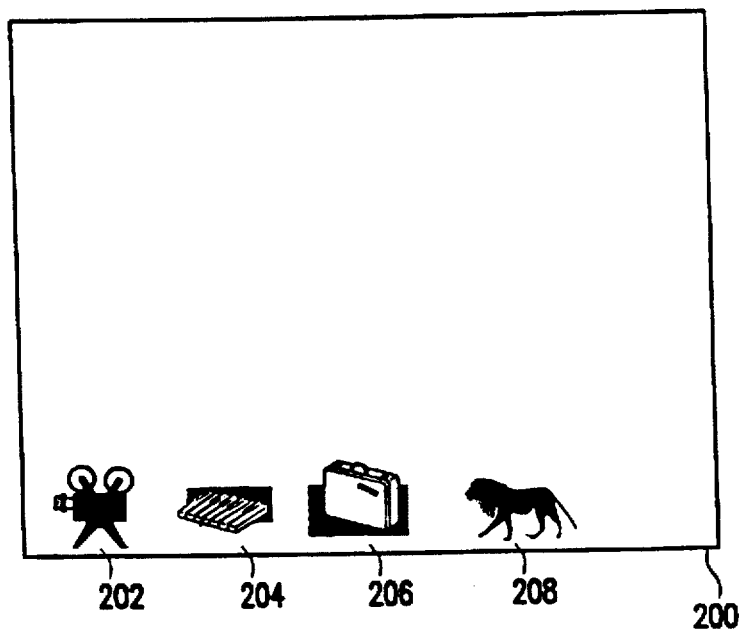
FIG. 2 shows a menu system in which the method of the invention is used.

FIG. 2 shows a given part of a menu system in which the method of the invention is used. In this part four options wherefrom a user can choose are displayed. An option represents a service which can be offered to the user. In the example shown in FIG. 2, an option is displayed as a symbol characterizing the service it represents. This makes it easier for a user to select the service, but it is not an essential aspect of the invention. It is alternatively possible to display an option as a description of the associated service, as a short code or in another manner. The example shown in FIG. 2 concerns services for the supply of video films, music clips, travel information and nature documentaries, represented by the options 202, 204, 206 and 208, respectively. In conventional menu systems operating with such options the user designates a desired option and selects it. To this end, the user utilizes a control means, for example a mouse or a joystick whereby the user displaces an indicator, also referred to as a cursor, across the screen. The user positions the indicator on or near the desired option and affirms the selection by depressing a control. Notably the necessity of actively positioning the indicator is problematic to many users of these conventional systems. In a menu system in which the method of the invention is used, the menu system successively makes one of the options available for selection and the user affirms a proposal by depression of the control. Therefore, the user need not actively designate an option, since this is done by the menu system and it suffices for the user to express affirmation. In the example shown in FIG. 2, first the system is enabled for some time for the selection of the option 202, subsequently for the option 204, then for the option 206 and finally for the option 208. A user selects a given option by depressing the control at the instant at which the system is enabled for the selection of the relevant option.

In one application of this method, the system is enabled for the selection of a given option for approximately 15 seconds. A shorter or longer period of time is also possible and the actual duration is not an essential aspect of the invention. In practice a period of time will be chosen which suits the circumstances in which the user selects an option. In order to inform the user of the option for which the system is enabled, this option is visually emphasized. Emphasizing can be realised in various ways: showing an arrow near the option, making the option flash, inserting a halo around the option, and in many other ways. A given version of the system of the invention utilizes a text arranged in the option for the selection of which the system is enabled.

Figure 3:
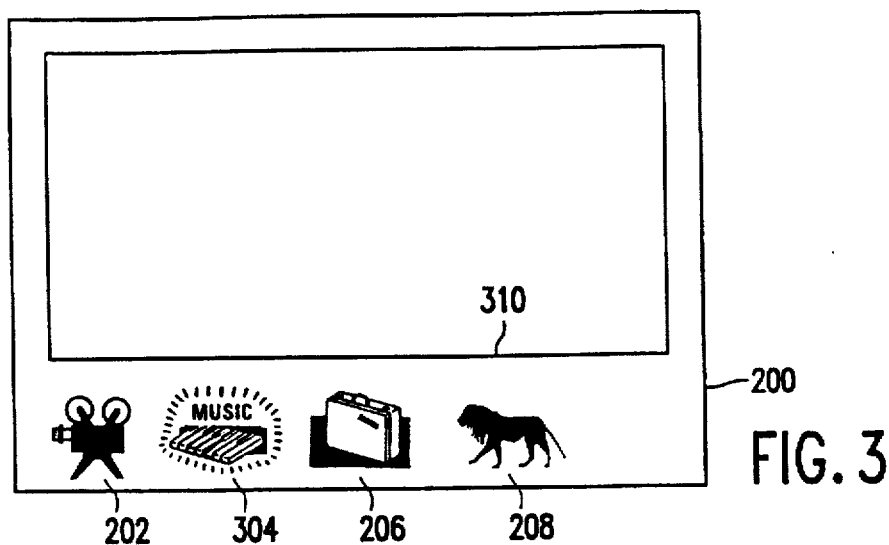
FIG. 3 illustrates how an option for the selection of which the system is enabled is characterized.

FIG. 3 illustrates, by way of example, how the option for the selection of which the system is enabled is emphasized in a system utilizing the method of the invention. It concerns a combination of highlighting of the option and insertion of a short text in the option. The symbol 304 in the Figure illustrates the appearance of the option 204 when the system is enabled for the selection of this option. The user affirms the selection of a given option by depressing the control at the instant at which the corresponding option lights up. When the user depresses the control in the case shown in FIG. 3, the system will start the service of delivering music clips. If a user does not select any option, after the last option 208 the method of the invention will enable the system again for selection of the first option 202 and subsequently the other options again. This cyclic mode of operation is not a requirement of the invention, and other sequences are also feasible. A reciprocating sequence could be adhered to, i.e. after the last option the last option-but-one again, and so on back to the first option, but an entirely different sequence is also feasible. The cyclic mode of operation offers a user-friendly organization: should the user miss an option, he will be given another opportunity and, because the actual sequence of presentation of options remains the same, the user can simply see an option coming up.

In a given alternative version of the method of the invention, further information is given as regards the service which can be selected. This further information may be given in the form of images displayed on the display screen 200, but also in the form of sound reproduced via the sound reproduction device of the user station. In FIG. 3, for example segments of the newest music clips which can be offered via the relevant service are displayed in the window 310 on the display screen 200. Instead of being displayed in a separate window, the images can also be displayed on the display screen 200 as a background. Such further information can be updated program-wise when the relevant service is modified. It may concern, for example a change of the contents of a service, such as the above newest music clips, but it may also concern an extension of services to be rendered, for example the possibility of reserving seats for concerts.

Figure 4:
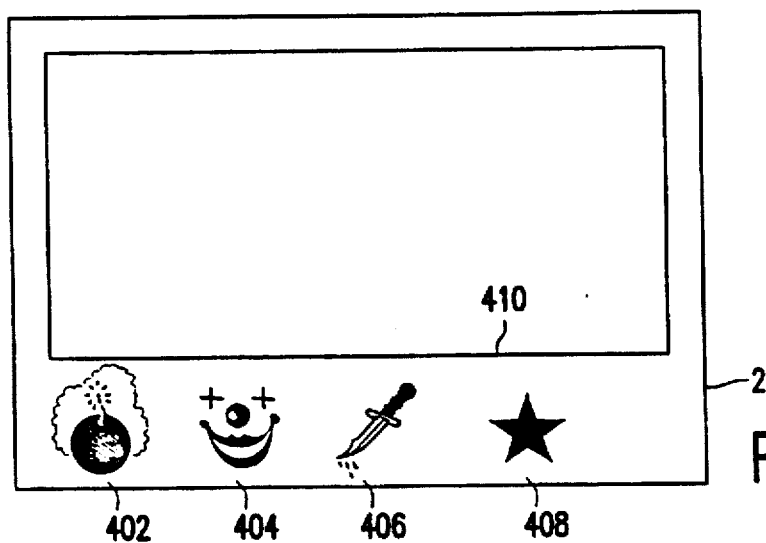
FIG. 4 shows a next level with options in the menu system.

The menu system utilizing the method of the invention may consist of several option selection levels. If the option 202 is selected in FIG. 2, being the service involving the supply of video films, at the next level the user may be requested to select a given category of film. By way of example, FIG. 4 shows the display screen after the selection of the option 202 by the user and the starting of the relevant service by the system. The options shown on the display screen in this case represent film categories wherefrom the user can select. In the present example, the option 402 represents action films, the option 404 represents comedies, the option 406 represents mysteries and the option 408 represents miscellaneous. A selection is made in exactly the same way as described with reference to FIG. 2. Additional information can again be displayed in a window 410, for example the top five films of the option for the selection of which the system is enabled. Such subdivision into levels can be continued until the service to be supplied has been sufficiently defined. For example, after selection of a given film category, the next level may be the display of a list of films available in the relevant film category and after selection of a film from this list the selected film can be shown to the user.

In a given embodiment of the system a user can deviate from the predetermined sequence in which the system is enabled for the options. In this embodiment the user has a control means whereby he can displace an indicator across the screen, thus designating a given option. This designation enables the system for selection of the relevant option. The relevant option can be selected by the user by depression of the control. Such designation and selection of an option under the control of the user is a suitable facility for experienced users who wish to make a direct selection from the services offered without requiring a further explanation.

Figure 5:
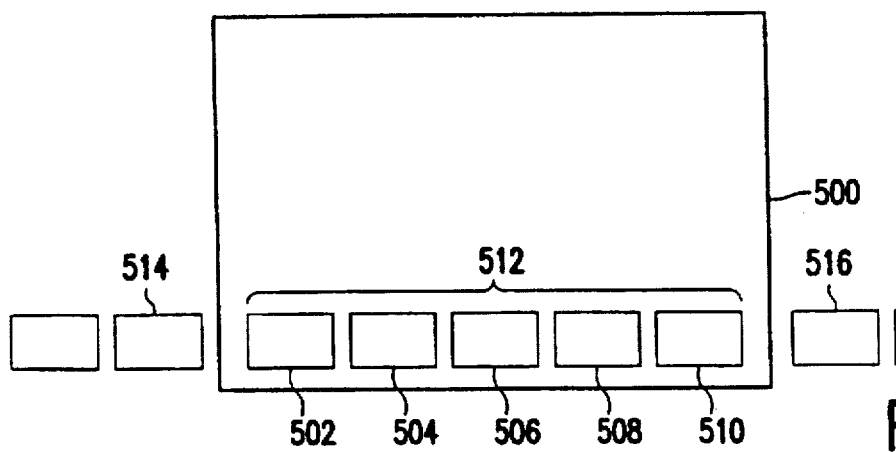
FIG. 5 shows a menu system in which the options are not all simultaneously displayed on the display screen.

FIG. 5 shows a menu system in which all options are not simultaneously shown on the display screen. In this case the space available on the display screen 500 is insufficient for simultaneous display of all options. In order to offer the user a choice from all options in this situation, the options are displaced horizontally across the screen. For the description of the following example the options are chosen to move from right to left. However, mutatis mutandis the principle can also be used for motion from left to right. The options of the group 512 are visible on the display screen at this instant; the option 514 has recently been visible and now moved away, and the option 516 will be displayed on the display screen to replace the option 502 when the latter is shifted away. The numbers 502-510 indicate fixed positions on the display screen in which each time a next option is shown. The options can again be linked so as to form a cyclic series, so that in the course of time the options disappearing from the display screen at the left-hand side enter the screen again from the right-hand side. One of the options in the group 512 is the option for the selection of which the system is enabled and is characterized as such. A symmetrical set-up can be chosen in this respect, this option then being present in the position 506 at the centre of the group 512. The number of options on the display screen for the selection of which the system has recently been enabled (i.e. in 502 and 504) equals the number of options for the selection of which the system will be enabled in the near future (i.e. in 508 and 510). Alternatively an asymmetrical set-up can be chosen, the option for the selection of which the system is enabled then being present in the position 504 or the position 502. In the case of the latter set-up there are more future options to be seen than past options, which may be more compatible with the user's needs in given circumstances. The future options are comparatively new and require more attention than the past options which have already been displayed on the display screen for the duration of a number of shift operations and which, moreover, cannot be selected in the short term anyway.

We claim:

1. A method of enabling a user to select a particular one from among a plurality of services available in a system, each respective one of the services being visually represented on a display screen by a respective one of a plurality of options, wherein the method comprises:

automatically making each individual one of the options temporarily available, in a predetermined sequence, for selection, detecting said selection of a particular one of the options while the system has made available the particular option for selection, presenting the service represented by the selected option, simultaneously displaying on the display screen the particular option temporarily made available and at least one further option from the sequence, and characterizing the particular option as temporarily made available for selection.

2. A method as claimed in claim 1, characterized in that the method includes the presentation, while the system is enabled for selection of the given option, of informative data concerning the service represented by the given option, the informative data not being necessary to distinguish the options from one another.

3. A method as claimed in claim 2, characterized in that the informative data are audio and/or visual data.

4. A method as claimed in claim 1, characterized in that the system is enabled for selection of one of the options in a cyclic sequence.

5. A method as claimed in claim 1, characterized in that the method comprises:

detection of designation of an option by the user, and enabling the system for selection of the designated option on the basis of the designation and as a deviation from said sequence.

6. A method as claimed in claim 1, characterized in that the service includes rendering selectable a further service in a hierarchy of options in a similar manner as specified in claim 1.

7. A method as claimed in claim 1, characterized in that the method is used to select a video film.

8. A system for selecting a service from among a plurality of services available, which system comprises a server and a user station, wherein:

the server comprises:

server means for dispatching a series of options and the services under control of control signals, and server connection means for receiving the control signals and for dispatching the series of options and the service, the user station comprises:

a display screen and station connection means for connection to the server connection means to dispatch the control signals and to receive the series of options and the services presentation means for automatically and temporarily enabling the user station for selection of a particular one of the options in a predetermined sequence, and selection means for selecting the particular option, and wherein;

the presentation means controls the display screen for simultaneous display of the particular option and at least one other one of the options, and the presentation means characterizes the particular option as temporarily made available for selection.

9. A system as claimed in claim 8, characterized in that the user station comprises means for requesting, by way of the control signals, informative data concerning the service represented by the given option, that the server means are arranged to dispatch the informative data via the server connection means and under the control of the control signals, and that the presentation means are also arranged to display on the display screen the informative data received via the station connection means.

10. A system as claimed in claim 9, in which the user station comprises a sound reproduction device, characterized in that the presentation means are arranged to reproduce the informative data, received via the station connection means, via the sound reproduction device.

11. A system as claimed in claim 8, characterized in that the presentation means are arranged to enable the user station for selection of one of the options in a cyclic sequence.

12. A system as claimed in claim 8, in which the user station is arranged to receive user signals from a user, characterized in that the presentation means are arranged to designate an option on the display screen under the control of the user signals, and that the presentation means are also arranged to enable the user station for selection of the designated option.

13. A server for supplying a plurality of services, the server comprising:

storage means for storing data transferable to a user station through the services, presentation means for temporarily enabling selection of a particular one of a plurality of options by a user, each respective one of the options being representative of a respective one of the plurality of the services, processing means for dispatching, under the control of first control signals, the data for a particular one of the services upon selection of the particular option and the presentation means to the user station, wherein the presentation means controls a display screen of the user station for simultaneous display of the particular option and at least one further one of the options, and the presentation means characterizes the particular option as temporarily made available for selection.

14. A server as claimed in claim 13, characterized in that the processing means are arranged to dispatch informative data under the control of second control signals, and that the presentation means are arranged to display the informative data on the display screen.

15. A server as claimed in claim 14, characterized in that the presentation means are arranged to produce the informative data via a sound reproduction device.

16. A server as claimed in claim 13, characterized in that the presentation means are arranged to enable the user station for selection of one of the options in a cyclic sequence.

17. A server as claimed in claim 13, characterized in that the presentation means are arranged to designate an option on the display screen under the control of user signals, and that the presentation means are also arranged to enable the user station for selection of the designated option.

18. An apparatus for enabling a user to select a particular one from among a plurality of services made available through a server system, the apparatus being connectable to the server system and to a display screen, the apparatus comprising:

connection means for dispatching control signals to the server system and for receiving a series of user-selectable options from the server system, respective ones of the user-selectable options being representative of a respective one of the services;

an output for dispatching image signals to the display screen, presentation means for automatically temporarily enabling the apparatus for selection of each individual one of the options in a predetermined sequence, and selection means for allowing the user to select a particular one of said options for which the apparatus is automatically and temporarily enabled, wherein:

the presentation means controls the display for simultaneous representation of the particular option and at least another one of the options, and the presentation means characterizes the particular option as being temporarily made available for selection.

19. An apparatus as claimed in claim 18, characterized in that the apparatus comprises means for requesting, by way of the control signals, informative data concerning the service represented by the given option, and that the presentation means are arranged to display on the display screen the informative data received via the connection means.

20. An apparatus as claimed in claim 19, characterized in that the presentation means are arranged to reproduce, via a sound reproduction device, the informative data received via the connection means.

21. An apparatus as claimed in claim 18, characterized in that the presentation means are arranged to enable the apparatus for selection of one of the options in a cyclic sequence.

22. An apparatus as claimed in claim 18, the apparatus being arranged to receive user signals from a user, characterized in that the presentation means are arranged to designate an option on the display screen under the control of the user signals, and that the presentation means are also arranged to enable the apparatus for selection of the designated option.

* * * * *